(12) United States Patent
Louch

(10) Patent No.: US 8,427,438 B2
(45) Date of Patent: Apr. 23, 2013

(54) VIRTUAL INPUT TOOLS

(75) Inventor: John O. Louch, San Luis Obispo, CA (US)

(73) Assignee: Apple Inc., Cupertino, CA (US)

( * ) Notice: Subject to any disclaimer, the term of this patent is extended or adjusted under 35 U.S.C. 154(b) by 366 days.

(21) Appl. No.: 12/412,218

(22) Filed: Mar. 26, 2009

(65) Prior Publication Data
US 2010/0245260 A1 Sep. 30, 2010

(51) Int. Cl.
G06F 3/041 (2006.01)
G06F 3/048 (2006.01)

(52) U.S. Cl.
USPC .......................................... 345/173; 715/838

(58) Field of Classification Search ............... 345/173
See application file for complete search history.

(56) References Cited

U.S. PATENT DOCUMENTS

| | | | |
|---|---|---|---|
| 5,940,076 A * | 8/1999 | Sommers et al. | 715/834 |
| 6,031,519 A * | 2/2000 | O'Brien | 345/156 |
| 6,411,275 B1 * | 6/2002 | Hedberg | 345/156 |
| 6,611,253 B1 * | 8/2003 | Cohen | 345/168 |
| 2002/0060669 A1 | 5/2002 | Sze | |
| 2004/0004604 A1 * | 1/2004 | Numano | 345/173 |
| 2004/0041723 A1 * | 3/2004 | Shibamiya et al. | 341/176 |
| 2005/0024341 A1 * | 2/2005 | Gillespie et al. | 345/173 |
| 2006/0033723 A1 | 2/2006 | Maw | |
| 2006/0242602 A1 * | 10/2006 | Schechter et al. | 715/838 |
| 2007/0162875 A1 * | 7/2007 | Paquette et al. | 715/847 |
| 2008/0109721 A1 * | 5/2008 | Liao et al. | 715/702 |
| 2008/0301570 A1 | 12/2008 | Milstead et al. | |
| 2009/0058821 A1 | 3/2009 | Chaudhri et al. | |
| 2009/0193364 A1 * | 7/2009 | Jarrett et al. | 715/838 |

FOREIGN PATENT DOCUMENTS
EP 2 076 000 A2 7/2009

OTHER PUBLICATIONS

Notification of Transmittal of the International Search Report and the Written Opinion of the International Searching Authority, or the Declaration for Application No. PCT/US2010/028494, dated Jun. 1, 2010, 14 pages.

* cited by examiner

*Primary Examiner* — Joseph Haley
*Assistant Examiner* — Nicholas Lee
(74) *Attorney, Agent, or Firm* — Fish & Richardson P.C.

(57) ABSTRACT

A virtual input device, e.g., a virtual representation of a physical input device, is disclosed. In one aspect, virtual coordinates of the virtual input device correlate to real coordinates on the physical input device. Dimensions of the physical input device are proportional to dimensions of the virtual input device, and interactive objects are presented in the virtual input device.

32 Claims, 7 Drawing Sheets

VIRTUAL INPUT TOOLS

TECHNICAL FIELD

This subject matter is generally related to user interface tools for electronic devices.

BACKGROUND

Traditional user interfaces allow a user to navigate between one or more interface elements (e.g., application windows) through the use of physical input devices (e.g., a keyboard, mouse, trackpad or touchpad). For example, a user can press a combination of keys (e.g., Command+Tab) on a keyboard to cycle between the one or more interface elements. As another example, a user could use a mouse or trackpad to search for and activate (e.g., by clicking on) individual interface elements in the user interface.

In particular, input received at an initial position on a trackpad can be compared to subsequent positions of input received on the trackpad. The relative change from the initial position to the subsequent positions determines an amount and direction of movement of a cursor, for example, from the cursor's current position in the user interface. In other words, the cursor's movement is based on a relative change in positions of input received through the trackpad. Because the cursor's movement is based on the relative change in positions on the trackpad, a position on the trackpad does not correspond to a single position in the traditional user interface. In addition, interaction between the user and the interface depends on the initial position of the cursor in the interface.

Other methods of navigating to interface elements are possible. Nevertheless, as the number of interface elements in the user interface increases, the difficulty or inconvenience of interacting with (e.g., navigating to or controlling) a desired interface element may increase.

SUMMARY

A virtual input device, e.g., a virtual representation of a physical input device, is disclosed. In one aspect, virtual coordinates of the virtual input device correlate to real coordinates on the physical input device. Dimensions of the physical input device are proportional to dimensions of the virtual input device, and interactive objects are presented in the virtual input device.

Particular embodiments of the subject matter described in this specification can be implemented to realize one or more of the following advantages. Virtual representations of input devices, that can include interactive, virtual representations of objects (e.g., application windows, applications, directories), allow a user to navigate to the objects more efficiently, thereby improving an ease of interacting with the objects and improving a user's experience. A virtual representation of an input device can be a two-dimensional area that increases an amount of data (e.g., virtual representations of objects) that can be presented at a particular time, thereby improving the user's experience.

Furthermore, the virtual representations of the input devices can have dimensions that are proportional to the input devices (e.g., physical input devices). As a result, the user can interact with an interface more efficiently because input provided by the user through the input device corresponds visually with indications of that input in the virtual input device. In particular, a user does not have to look at the input device when interacting with the virtual input device, as the user can expect that his/her input through the input device will correspond to similar input (or interaction) at the virtual input device. In addition, because each position on the virtual device corresponds to a single position on the physical device, a user can navigate through an entire virtual space of the virtual device (e.g., up to and including the borders of the virtual representation) using a single gesture (e.g., by keeping a user's finger down on a trackpad).

DESCRIPTION OF DRAWINGS

Like reference numbers and designations in the various drawings indicate like elements.

DETAILED DESCRIPTION

Example Virtual Input Device Application

Figure 1:
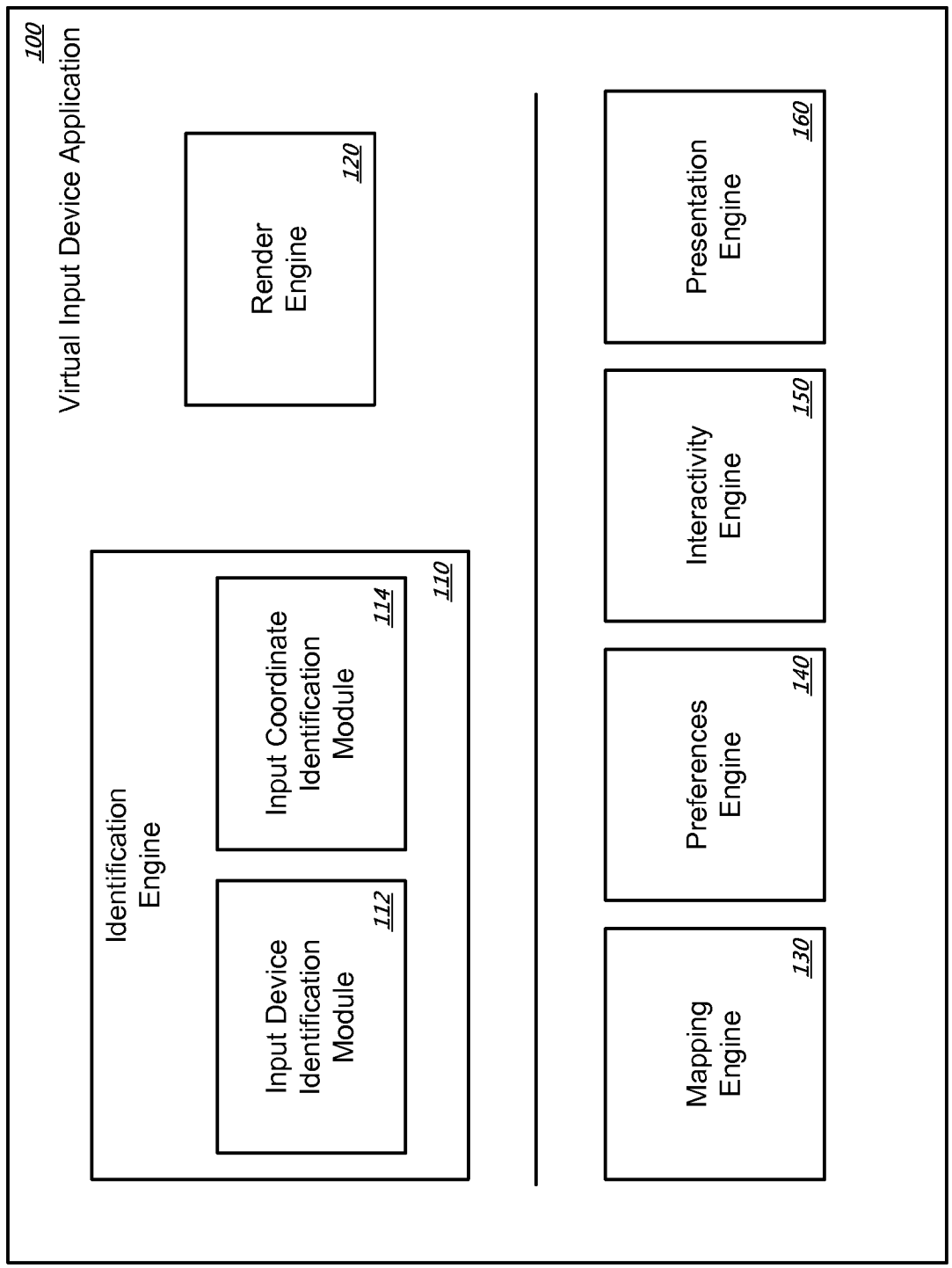
FIG. 1 is a block diagram showing an example virtual input device application.

FIG. 1 is a block diagram showing an example virtual input device application 100. The virtual input device application 100 includes an identification engine 110 for identifying input devices and input through the input devices (e.g., physical input devices); a render engine 120 for rendering content; a mapping engine 130 for mapping/correlating input for presentation; a preferences engine 140 for setting preferences associated with, for example, the display and configuration of a virtual input device; an interactivity engine 150 for processing interactions between a user and a physical input device and a corresponding virtual input device, for example; and a presentation engine 160 for presenting a virtual input device to a user.

Engines 110, 120, 130, 140, 150, and 160 can be communicatively coupled to one or more of each other. Though the engines identified above are described as being separate or distinct, one or more of the engines may be combined in a single process or routine. The functional description provided herein including separation of responsibility for distinct functions is by way of example. Other groupings or other divisions of functional responsibilities can be made as necessary or in accordance with design preferences.

Identification engine 110 can be used to initially identify a physical input device (e.g., a multi-touch trackpad, a keyboard). In particular, input device identification module 112 can be used to detect an input source and identify a corresponding physical input device. Furthermore, input coordinate identification module 114 can be used to detect input received at an identified physical input device. For example, input coordinate identification module 114 can use hooks to detect hardware interrupts that are generated by key presses on a keyboard, mouse clicks, or gestures on a multi-touch trackpad. Furthermore, the input coordinate identification module 114 can detect an origin of the input on the physical input device (e.g., one or more real coordinates on the physical device where the input was received). For example, if a user right-clicks a mouse, the input coordinate identification module 114 can detect that a user clicked a right mouse button. As another example, if a user presses the "A" key on a keyboard, the input coordinate identification module 114 can detect that the user pressed the "A" key. As another example, the input coordinate identification module 114 can track and store coordinates (e.g., in a memory) that correspond to an input gesture received at a multi-touch trackpad. The coordinates can be stored in a data structure (e.g., an array in the memory) for further processing by mapping engine 130, for example.

Identification engine 110 can also be used to identify one or more objects that can displayed in a interface (e.g., a graphical user interface). Examples of objects include, but are not limited to interface windows (e.g., applications windows), documents (e.g., videos, images, text), file directories, and applications. As will be described in further detail below, virtual representations of the objects (e.g., virtual objects) can be generated and presented in a virtual input device, so that a user can more quickly interact with the objects.

Render engine 120 can be used to render user interface tools or content to be presented to a user. Render engine 120 can be placed in whole or in part in the identification engine 110. Alternatively, the render engine 120 may be part of another engine, such as, for example, presentation engine 160, and a separate stand-alone application that renders content. Render engine 120 can be used to render a virtual input device, e.g., a virtual representation of a corresponding physical input device. For example, the virtual input device can be generated as a three-dimensional model that is stored in memory. In some implementations, the render engine 120 can render the virtual input device, such that the virtual dimensions of the virtual input device are proportionate to the physical dimensions of the corresponding physical input device. The render engine 120 can also render virtual objects for display in the virtual input device. The virtual objects can be rendered such that they are scaled to fit within the virtual input device. The virtual objects can be rendered to be different sizes, based on the content that the virtual objects represent, while maintaining a similar aspect ratio as the ratio in which the virtual input device is proportionate to the physical input device.

In some implementations, render engine 120 can render interface windows (e.g., Finder and application windows in Mac OS X) such that they can be displayed in the virtual input device. For example, render engine 120 can interact with Expose for Mac OS X (and presentation engine 160) to render and present the interface windows in the virtual device. In some implementations, only open, unhidden interface windows are scaled for display in the virtual input device. In some implementations, all open and unhidden windows for a currently active application can be scaled for display in the virtual input device. In some implementations, all open windows (hidden and unhidden) can be scaled for display in the virtual input device. Other implementations are possible.

In some implementations, all the virtual objects may not be able to be presented in the virtual input device at once. Render engine 120 can render the virtual input device such that there is an indication that there are additional virtual objects that can be displayed. For example, a control object such as a page scrollbar or a line scrollbar can be rendered along with the virtual input device. As another example, an arrow can be rendered at a top or bottom of the virtual input device to indicate that additional virtual objects are available. A user could provide input at a position of the arrow, or use a gesture, to navigate to the additional virtual objects. In this manner, the virtual input device provides a single, convenient location, where a user can interact with objects that may or may not be currently displayed in the interface.

Mapping engine 130 can be used to correlate or map virtual coordinates on the virtual input device to physical coordinates on the physical input device. For example, the mapping engine 130 can generate a grid for each of the virtual input device and the physical input device that includes coordinates corresponding to the respective device. The mapping engine 130 can then use an algorithm to correlate the virtual coordinates to the physical coordinates, based on the respective ratios (e.g., aspect ratios) of the virtual input device and the physical input device (e.g., since the aspect ratio of each device can be the same). The correlated coordinates can be stored in memory using a data structure such as a hash table, for example.

In some implementations, the mapping engine 130 can use anamorphic scaling. Different regions on the grids can be correlated using different factors (e.g., ratios). For example, regions closer to edges of the virtual input device can be "less sensitive". In particular, the regions closer to the edges of the virtual input device can be considered less sensitive, because each virtual coordinate near an edge can be mapped to more than one physical coordinate on the physical input device (e.g., a physical input coordinate farther away from the edge). This type of anamorphic scaling can be desirable because users may be more likely to lift their fingers off of a trackpad, for example, before reaching the edge of a trackpad, but still intend to provide input to the edge of the trackpad.

Mapping engine 130 can also be used to map physical coordinates on the physical input device to virtual coordinates on the virtual input device based on input received through the physical input device. For example, mapping engine 130 can use the grid (e.g., stored in the hash table) to map the corresponding coordinates. Because the virtual dimensions of the virtual input device can be proportionate to the physical dimensions of the corresponding physical input device, input received at a particular position on the physical input device can be presented (e.g., indicated, or affect a position or virtual object at the position) at a same relative position on the virtual input device.

Because of this visual correspondence, a user can expect that his/her input through the input device will correspond to similar input (or interaction) at the virtual input device, and be able to more quickly interact with the virtual input device using a minimized amount of input, as shown in the examples described below with reference to interactivity engine 150.

Preferences engine 140 can be used to query a user for preferences during the processes of generating and interacting with the virtual input device. Preferences engine 140 also may be used to set preferences to default values, to modify preferences that have already been set, and to present the preference selections to a user. Preferences may relate to, for example, a size of the virtual input device, opacity of the virtual input device, colors of the virtual input device, input sensitivity of the virtual input device, positioning of the virtual input device, a memory setting for any of the aforementioned preferences, and other preferences that provide for modification of the shape, control, placement, and virtual object renderings and animations in the virtual input device.

Interactivity engine 150 can process interactions between a user, a virtual input device, and a physical input device, for example, by storing information describing the various types of input provided by the user at the physical input device. Interactivity engine 150 can use such stored information to determine what action is desired in response to a user's interaction with physical input device, and to perform the desired action.

For example, interactivity engine 150 can (1) receive an indication that a user has tapped an upper right quadrant of a trackpad, (2) determine that an interface window associated with the upper right quadrant of a trackpad should be activated, and (3) initiate and facilitate a request and display of the interface window. As another example, interactivity engine 150 may (1) receive an indication, e.g., a gesture such as a slide of a finger across the upper right quadrant of the trackpad, that a user would like to preview the interface window, (2) determine that a visual representation of the interface window should be displayed on the virtual input device, (3) render a smaller representation of the interface window (e.g., using the render engine 120), and (4) present the smaller representation of the interface window in the upper right quadrant of the trackpad. As another example, interactivity engine 150 can be used to hide and display the virtual input device in response to a predetermined input, e.g., a gesture such as a four finger touch on a multi-touch trackpad.

In some implementations, interactivity engine 150 can (1) receive an indication that a user has tapped a quadrant of a trackpad, (2) determine that a particular portion or item of a single data source or document is associated with the tapped quadrant, and (3) initiate and facilitate a request and display of the particular part or item. For example, a particular paragraph of a text document could be associated with the quadrant, and tapping on the quadrant results in display of the particular paragraph. As another example, a particular feature of an application (e.g., a spell-checking tool) can be associated with the quadrant, and tapping on the quadrant results in activating the spell-checking tool. Other implementations are possible.

For example, interactivity engine 150 can (1) receive an indication that a user has tapped a quadrant of a trackpad, (2) determine that a software application is associated with the tapped quadrant, and (3) initiate and facilitate a request and display of all documents of the application that are currently open in the virtual input device. In some implementations, the documents can be displayed in a third dimension, e.g., as another layer superimposed on the original virtual input device. Other implementations are possible.

In some implementations, interactivity engine 150 processes interactions from a user such that the virtual input device acts like a system model state. For example, the virtual input device does not interrupt the user's current state (e.g., current system state) unless the user selects a virtual object in the virtual input device. Acting like a system model state allows the user to quickly select or browse virtual objects presented in the virtual input device without interrupting the user's current state.

In some implementations, interactivity engine 150, identification engine 110, and mapping engine 130 can process more complex gestures (e.g., multi-touch gestures). For example, a user could place an index, middle, ring, and pinky finger of one hand on a multi-touch trackpad. The user could lift the index, middle, and ring finger, to indicate a movement of a cursor or selection, for example, quickly from one edge (e.g., left edge) of the virtual input device to an opposite edge (e.g., right edge). In some implementations, the interactivity engine 150, identification engine 110, and mapping engine 130 can use the positions of a multi-touch input to identify particular fingers at each position. Identifying particular fingers can be useful for weighting inputs differently for particular fingers or averaging the individual inputs. For example, a left most finger can be identified as controlling a selection, or used as a center weight between all of the inputs.

Presentation engine 160 can present the virtual input device in the user interface. In addition, presentation engine 160 can also present the virtual objects (e.g., icons, interactive objects, pictures, videos, thumbnails) on the virtual input device.

In some implementations, presentation engine 160 can switch among presentations of a plurality of virtual input devices. For example, when identification engine 110 detects input from a trackpad, a virtual trackpad can be displayed in the user interface. If the identification engine 110 then detects input from a keyboard, a virtual keyboard can be displayed in the user interface. Upon detecting input from another physical input device (e.g., a mouse, or the trackpad again), the presentation engine 160 can present a virtual input device that corresponds to the other physical input device, upon rendering of the virtual input device by the render engine 120, for example.

Example Virtual Input Devices

Figure 2:
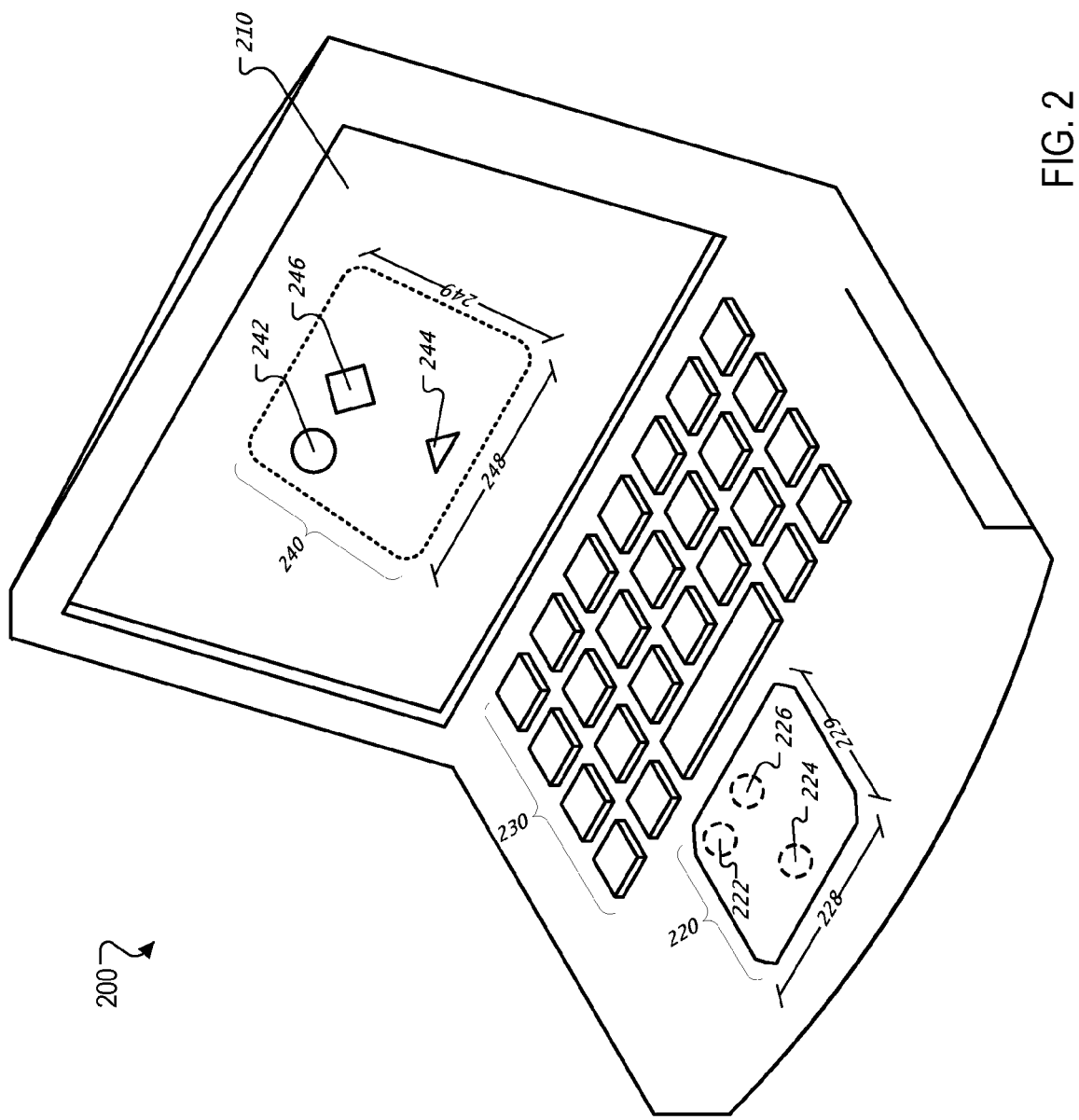
FIG. 2 is a diagram of an example computer that is displaying a virtual input device.

FIG. 2 is a diagram of an example computer 200 (e.g., a laptop computer) that is displaying a virtual input device 240. The computer 200 includes a display device 210 (e.g., an LCD screen) and two physical input devices. The two physical input devices include a trackpad 220 (e.g., an Apple Multi-Touch trackpad) and a keyboard 230. In some implementations, the computer 200 can include or be connected to other types of input devices. The computer 200 can be connected to additional pointing devices including, for example, mice, joysticks, pointing sticks, and digital graphics tablets. As another example, the computer 200 can be connected to audio or video input devices including, for example, microphones, webcams, and scanners (e.g., image scanners).

As described above, and in further detail below, a virtual input device application can generate a virtual input device (e.g., a virtual trackpad 240) based on a physical input device (e.g., trackpad 220). In some implementations, the virtual trackpad 240 has dimensions that are proportionate to the trackpad 220. A user can interact with virtual objects (e.g., virtual objects 242, 244, and 246) displayed on the virtual trackpad 240 by providing input at corresponding positions (e.g., physical coordinates) on the trackpad 220. In some implementations, a user can provide input (e.g., gestures) to switch among two or more data sources or documents, so that objects associated with a selected data source or document (e.g., hierarchies within a document) are presented in the virtual input device. Furthermore, in some implementations, a user can provide input to change the magnification of the virtual input device or the objects presented in the virtual input device to enlarge or shrink the respective visual representations.

Because the dimensions of the virtual trackpad 240 are proportionate to the trackpad 220, a user does not have to look at the trackpad 220 to select virtual objects, for example, displayed on the virtual trackpad 240.

In particular, positions with a same relative distance from the outer dimensions of the trackpad 220 and the virtual trackpad 240 can be considered corresponding positions. For example, if the trackpad 220 has horizontal (dimension along edge 228) and vertical (dimension along edge 229) dimensions of 1.5 inches and 2.0 inches respectively, the virtual trackpad 240 can have horizontal (dimension along edge 248) and vertical (dimension along edge 249) dimensions of 3.0 inches and 4.0 inches respectively. The positions of virtual objects 242, 244, and 246 correspond to positions 222, 224, and 226 (as indicated by the dotted circles), respectively. Virtual objects 242, 244, and 246 are displayed at virtual positions (e.g., virtual coordinates) on the virtual trackpad 240 that are a same relative distance from edge 248 and 249 as positions 222, 224, and 226 are from edge 228 and 229. For example, a shortest distance between the center of virtual object 246 and edge 249 can be 0.5 inches, and a shortest distance between the center of virtual object 246 and edge 248 can be 2.5 inches. Furthermore, a shortest distance between the position on the trackpad 220 that corresponds to the position of virtual object 246, e.g., position 226, and edge 229 can be 0.25 inches. A shortest distance between position 226 and edge 228 can be 1.25 inches.

Other configurations are possible. In the previous example, the virtual input device (e.g., virtual trackpad 240) had dimensions that were proportionate to the dimensions of the physical input device (e.g., trackpad 220) with a ratio of 2:1. In some implementations the ratio can be different. For example, the ratio can be inverted, e.g., a virtual keyboard can have dimensions that are proportionate to the keyboard 230 with a ratio of 1.0:3.5. The ratio can also be a predetermined ratio. For example, the ratio can be a default value, or a user can configure the ratio using the preferences engine 140. Other implementations are possible.

Figure 3:
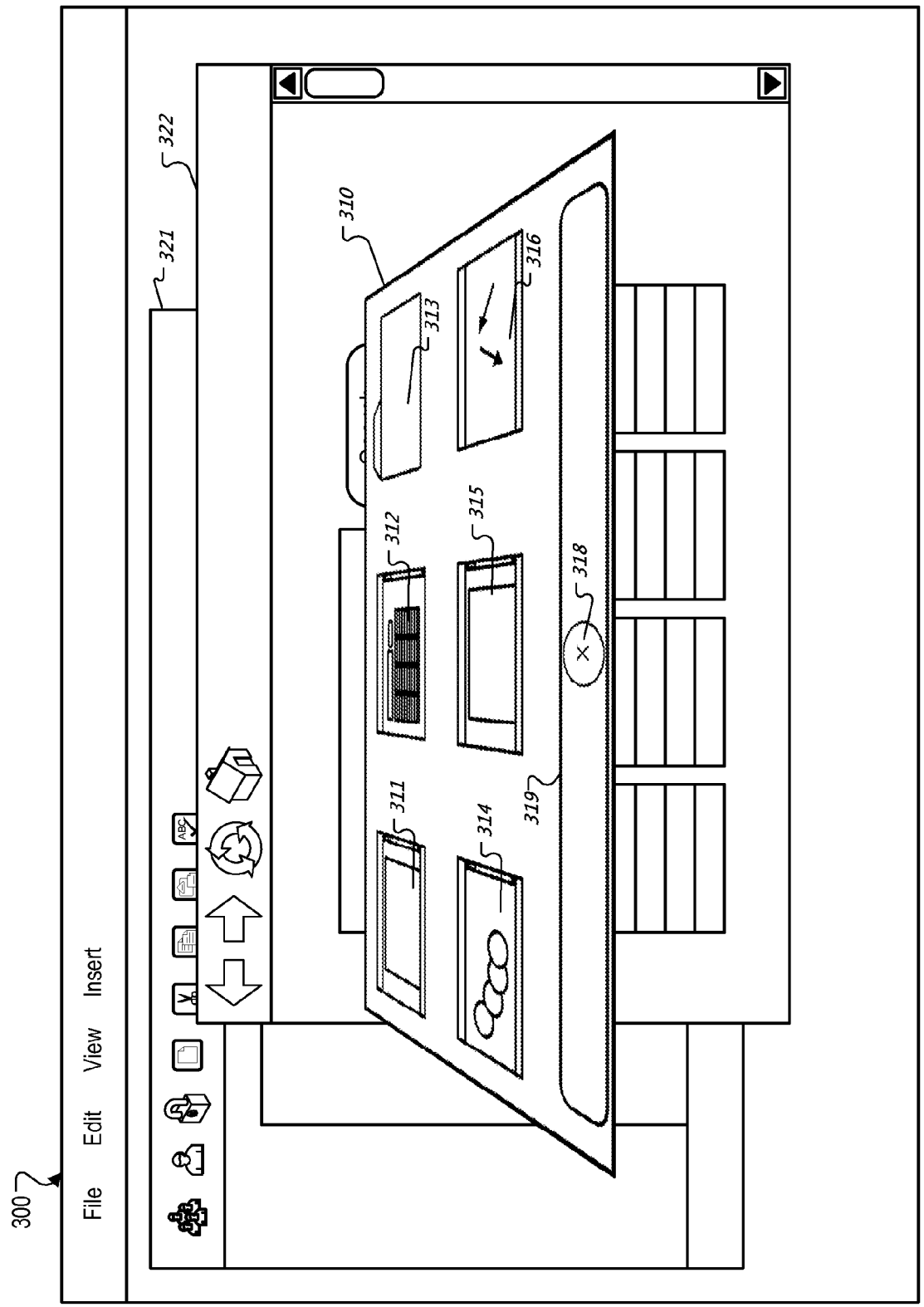
FIG. 3 illustrates an example interface that includes a virtual input device.

FIG. 3 illustrates an example interface 300 that includes a virtual input device 310. The virtual input device 310 (e.g., a virtual trackpad) includes virtual objects 311, 312, 313, 314, 315 and 316. In this example, the virtual objects 311-316 are visual representations (e.g., virtual representations) of corresponding interface windows in the interface 300. For example, virtual object 311 can be a smaller visual representation of interface window 321, and virtual object 312 can be a smaller visual representation of interface window 322.

Other implementations are possible. The virtual objects displayed on a virtual input device can be different types of visual representations of different types of content. For example, the visual representations can be images, animations, or videos. In addition, the visual representations can be two-dimensional or three-dimensional representations. Furthermore, the visual representations can be representations of different types of content. For example, the visual representations can represent documents, interface elements (e.g., interface windows), directories, and other types of objects (e.g., controls for a video player) and content that can be displayed in the interface.

The virtual objects can also be interactive. For example, a virtual object can be initially presented as a two-dimensional representation. Upon receiving input selecting or activating the virtual object, the virtual input device application can animate the virtual object such that it becomes a three-dimensional representation, or the virtual object provides a preview, e.g., the virtual object becomes a video clip or plays an audio clip. In some implementations, the virtual input device application 100 can generate text related to the virtual objects. For example, the text can be used to identify the virtual object. The text can be initially presented with the virtual objects, or be presented only with selected or activated virtual objects.

The virtual input device 310 also includes a control object 318. In this example, the control object 318 can be used to deactivate (e.g., hide, remove from display, or exit) the virtual input device 310. In some implementations, the control object 318 allows a user to cancel an interaction or selection. For example, a user can interact with the virtual input device without changing any content as long as the user's fingers are in continuous contact with a physical trackpad. The user can cancel any interaction or selection by lifting the user's fingers off at the position of the control object 318. In some implementations, the virtual input device 310 can be controlled based on other types of predetermined inputs. For example, a single tap on a trackpad can result in the virtual input device application entering a first mode, where a virtual trackpad is displayed in an interface. A double tap on the virtual trackpad can remove the virtual trackpad from display in the interface, in a second mode.

Other implementations are possible. For example, the virtual input device application can enter different modes based on a type of gesture (e.g., swipe on a trackpad, four-finger input on a multi-touch trackpad) received at the physical input device, or a combination of inputs (e.g., a combination of keystrokes on a physical keyboard, or a combination of button presses on a pointing device).

In some implementations, an indicator 319 (e.g., a border surrounding a virtual object, highlighting of a virtual object, animation of a virtual object) can be used to indicate a user's selection of the virtual object in the virtual input device 310. In FIG. 3, the indicator 319 indicates receipt of user input selecting the control object 318 to hide or exit the virtual input device 310. In addition, the indicator 319 (e.g., a border) can also be used to delineate a virtual area on the virtual input device that is proportional (based on a ratio as described above) to a physical area on the physical input device, where input received will indicate a selection of the virtual object associated with the indicator 319 (e.g., virtual object 312 in FIG. 4).

Figure 4:
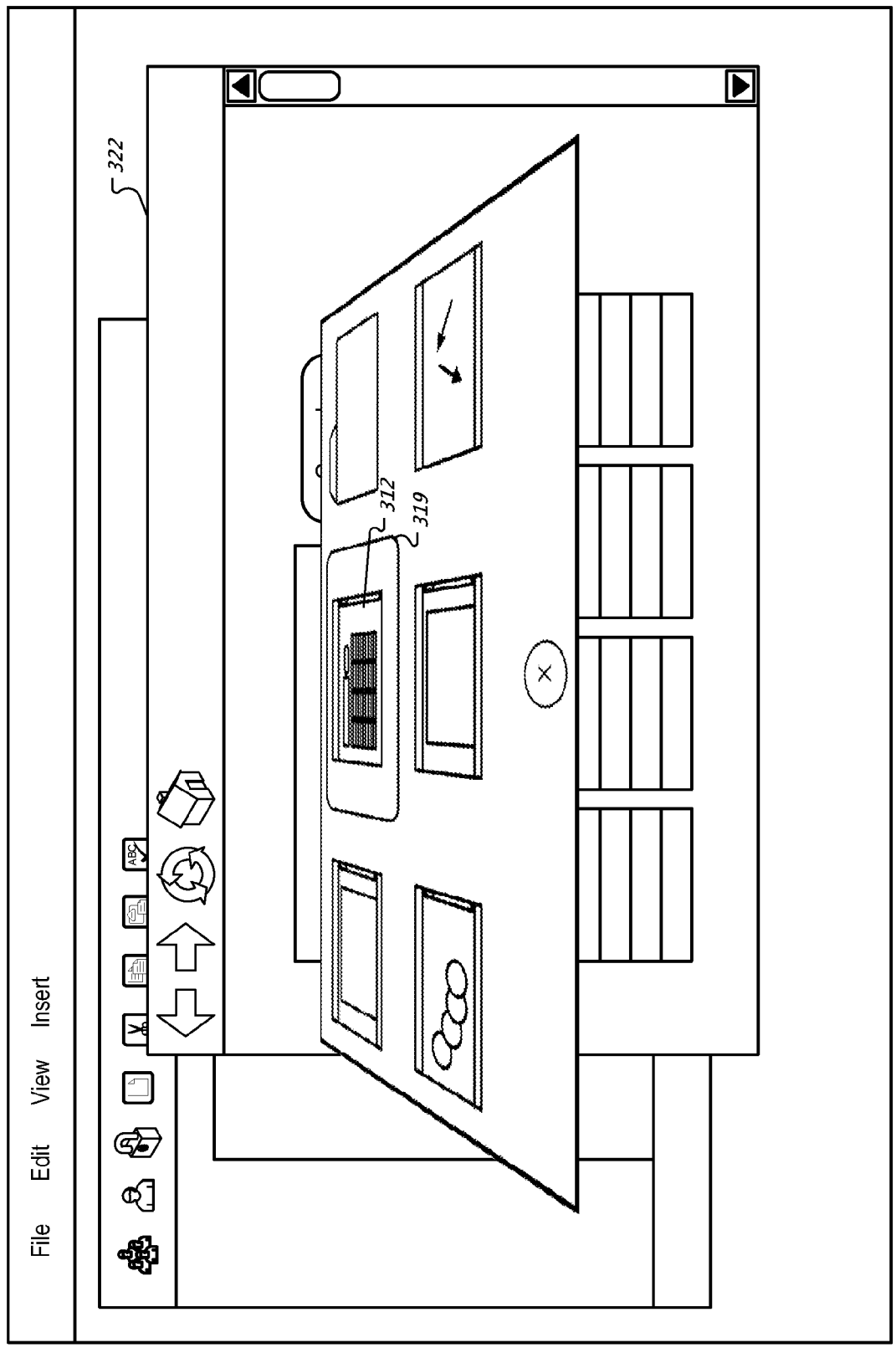
FIG. 4 illustrates the virtual input device of FIG. 3, where a virtual object is selected.

FIG. 4 illustrates the virtual input device 310 of FIG. 3, where a virtual object (e.g., virtual object 312) is selected. In particular, the virtual object 312 is indicated as a user's selection by the indicator 319. As shown in FIG. 4, the interface window 322 can be brought into user focus (e.g., the foreground of the interface 300) in response to the selection of the virtual object 312. Temporarily referring to FIG. 2, the virtual object 312 can be represented by virtual object 246. If a user provides input at position 226 through the trackpad 220, the virtual input device application can map the physical coordinates of position 226 to corresponding virtual coordinates that indicate a user's intent to interact with virtual object 246 in the virtual trackpad 240. In response to receiving the input at position 226, the virtual input device application can modify the virtual object 246 (e.g., indicate interaction, such as selection, of virtual object 312).

Figure 5:
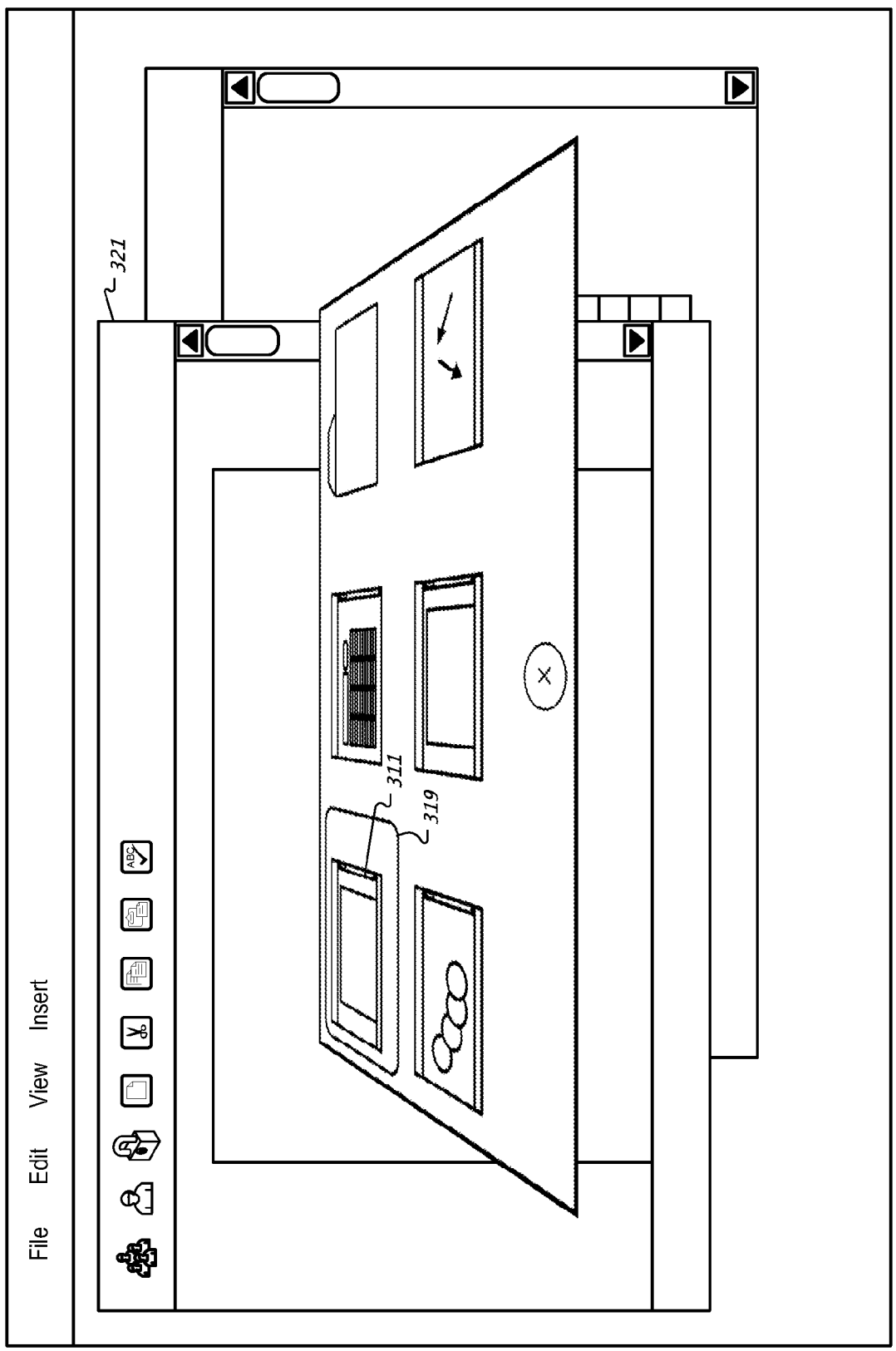
FIG. 5 illustrates the virtual input device of FIG. 3, where another virtual object is selected.

FIG. 5 illustrates the virtual input device 310 of FIG. 3, where another virtual object (e.g., virtual object 311) is selected. The virtual object 311 is indicated as the user's selection by the indicator 319. As shown in FIG. 5, the interface window 321 can be brought into user focus (e.g., the foreground of the interface 300) in response to the selection of virtual object 311. Temporarily referring to FIG. 2, the virtual object 311 can be represented by virtual object 242. If the user provides input at the position 222 through the trackpad 220, the virtual input device application can map the physical coordinates of position 222 to corresponding virtual coordinates that indicate the selection of virtual object 242 in the virtual trackpad 240 (or virtual object 311 in virtual input device 310).

The examples illustrated in FIGS. 3-5 show how user input received at a physical input device can be used to interact with a corresponding input device to indicate user focus on interface windows (e.g., application windows) of applications that are already open (e.g., running as a process on the operating system). Other implementations and interactions are possible. For example, a user can open documents (e.g., videos, images, audio, text) that are not currently open, launch applications that are not currently open, or control applications that are currently open.

Figure 6:
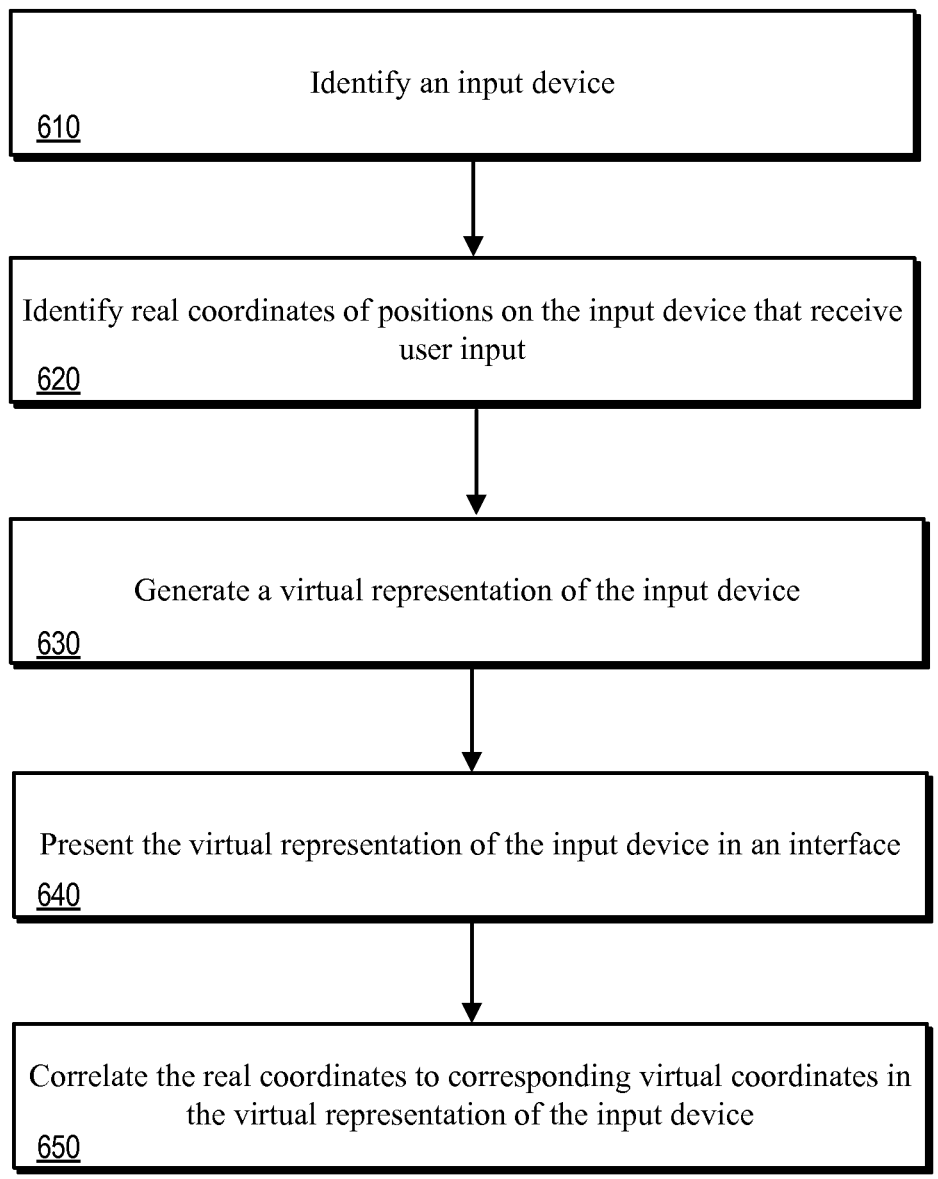
FIG. 6 is a flow chart showing an example process for generating a virtual input device.

FIG. 6 is a flow chart showing an example process 600 for generating a virtual input device. The process includes identifying 610 an input device (e.g., a physical input device). For example, the input device identification module 112 of the identification engine 110 can identify a physical input device such as a multi-touch trackpad. The process 600 also includes identifying 620 real coordinates of positions on the input device that receive user input. For example, the input coordinate identification module 114 of the identification engine 110 can identify real coordinates of positions on the multi-touch trackpad that receive user input (e.g., gestures). The process 600 also includes generating 630 a virtual representation of the input device. For example, the render engine 120, identification engine 110, and mapping engine 130 can generate a virtual representation of the multi-touch trackpad. The process 600 also includes presenting 640 the virtual representation of the input device in an interface. For example, the interactivity engine 150 and presentation engine 160 can present the virtual representation of the input device in the interface (e.g., a graphical user interface). The process 600 also includes correlating 650 the real coordinates to corresponding virtual coordinates in the virtual representation of the input device. For example, the mapping engine 130 can correlate the real coordinates to corresponding virtual coordinates.

Figure 7:
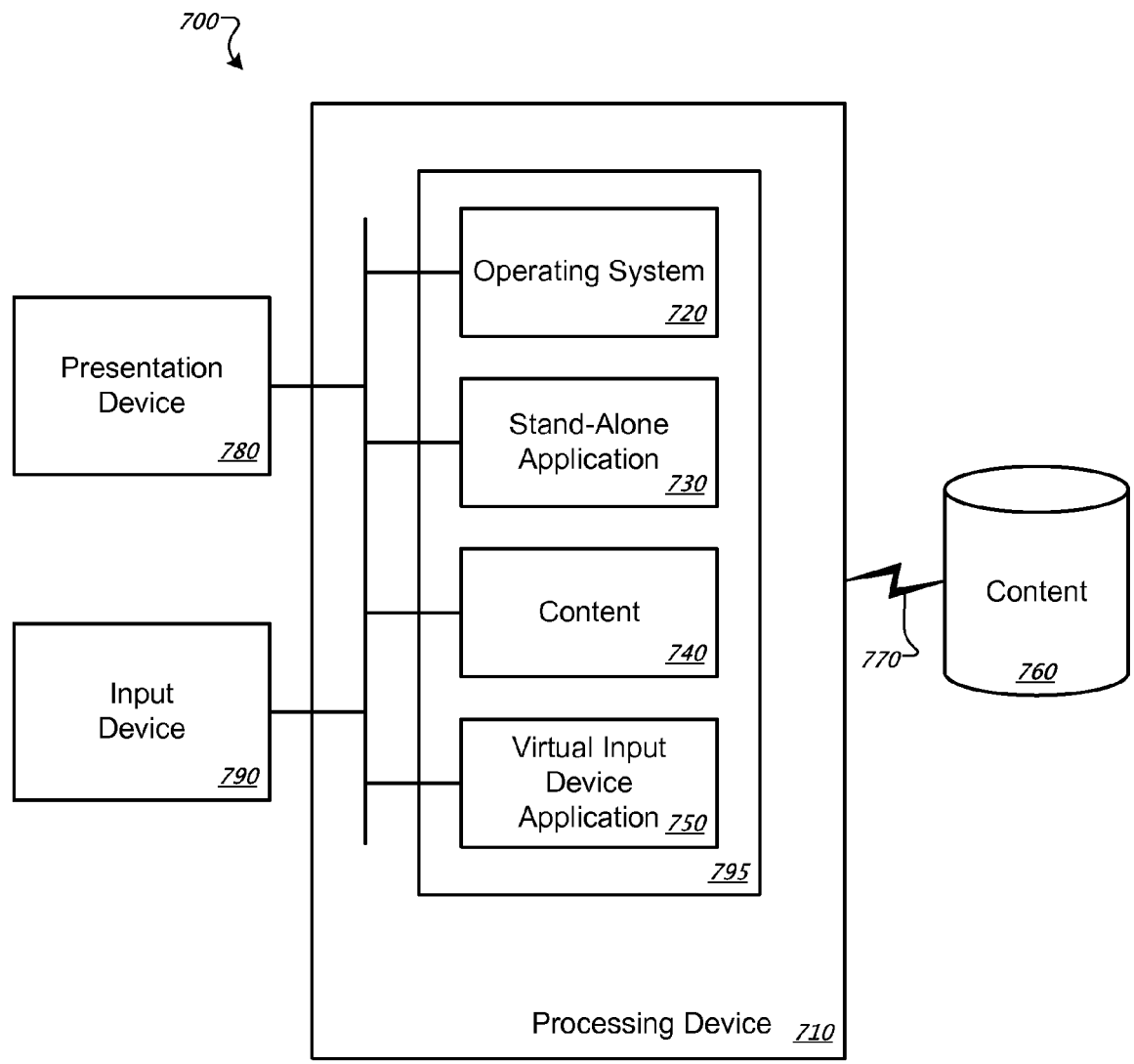
FIG. 7 is a block diagram showing a system for generating a virtual input device.

FIG. 7 is a block diagram showing a system 700 for generating a virtual input device. System 700 includes a processing device 710 (e.g., a data processing apparatus) having an operating system 720, a stand-alone application 730, a content source 740 (e.g., a data store), and a virtual input device application 750. Each of elements 720, 730, 740, and 750 is communicatively coupled, either directly or indirectly, to each other. Elements 720, 730, 740, and 750 are stored on a memory structure 795, such as, for example, a hard drive. System 700 also includes a presentation device 780 and an input device 790, both of which are communicatively coupled to processing device 710. System 700 can further include content source 760 that may be external to processing device 710, and communicatively coupled to processing device 710 over a connection 770.

Processing device 710 may include, for example, a computer, a gaming device, a messaging device, a cell phone, a personal/portable digital assistant ("PDA"), or an embedded device. Operating system 720 may include, for example, Mac OS X from Apple Inc. of Cupertino, Calif. Stand-alone application 730 may include, for example, a browser, a word processing application, a database application, an image processing application, a video processing application or other application. Content source 740 and content sources 760 may each include, for example, a document having any of a variety of formats, files, pages, media, or other content, and content sources 740 and 760 may be compatible with stand-alone application 730. Presentation device 780 may include, for example, a display, a computer monitor, a television screen, a speaker or other output device. Input device 790 may include, for example, a keyboard, a mouse, a microphone, a touch-screen, a remote control device, a speech activation device, or a speech recognition device or other input devices. Presentation device 780 or input device 790 may require drivers, and the drivers may be, for example, integral to operating system 720 or stand-alone drivers. Connection 770 may include, for example, a simple wired connection to a device such as an external hard disk, or a network, such as, for example, the Internet. Virtual input device application 750 as described in the preceding sections may be a stand-alone application as shown in system 700 or may be, for example, integrated in whole or part into operating system 720 or stand-alone application 730.

Processing device 710 may include, for example, a main-frame computer system, a personal computer, a personal digital assistant ("PDA"), a game device, a telephone, or a messaging device. The term "processing device" may also refer to a processor, such as, for example, a microprocessor, an integrated circuit, or a programmable logic device for implementing virtual input device application 100. Content sources 740 and 760 may represent, or include, a variety of non-volatile or volatile memory structures, such as, for example, a hard disk, a flash memory, a compact diskette, a random access memory, and a read-only memory.

Implementations may include one or more devices configured to perform one or more processes. A device may include, for example, discrete or integrated hardware, firmware, and software. Implementations also may be embodied in a device, such as, for example, a memory structure as described above, that includes one or more computer readable media having instructions for carrying out one or more processes. The computer readable media may include, for example, magnetic or optically-readable media. A processing device may include a device configured to carry out a process, or a device including computer readable media having instructions for carrying out a process. Instructions may be, for example, in hardware, firmware, or software.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. For example, engines 110, 120, 130, 140, 150, and 160 need not perform all, or any, of the functionality attributed to that engine in the implementations described above, and all or part of the functionality attributed to one engine may be performed by another engine, another additional module, or not performed at all. Accordingly, other implementations are within the scope of the following claims.

What is claimed is:

1. A computer-implemented method comprising:
identifying an input device that is coupled to a processing device;
identifying real coordinates of positions on the input device that receive user input;
generating a virtual representation of the input device;
correlating the real coordinates to corresponding virtual coordinates in the virtual representation of the input device using anamorphic scaling such that regions closer to edges of the virtual representation of the input device are configured to be less sensitive to physical input;
presenting the virtual representation of the input device in an interface that is coupled to the processing device;
identifying one or more applications that are currently under execution in the processing device;
generating virtual representations of each of the one or more applications, wherein the virtual representations of the one or more applications include visual representations of corresponding interface windows associated with the one or more applications that are displayed in the interface coupled to the processing device; and
automatically presenting the virtual representations of each of the one or more applications in the virtual representation of the input device that is displayed in the interface coupled to the processing device, wherein the virtual representations of each of the one or more applications are presented simultaneously in the virtual representation of the input device.

2. The method of claim 1, comprising:
identifying one or more objects for display in the interface;
generating virtual representations of each of the one or more objects; and
presenting the virtual representations of each of the one or more objects in the virtual representation of the input device.

3. The method of claim 2, comprising:
receiving a first input through the input device;
identifying first real coordinates on the input device that identify a position on the input device where the first input was received;
mapping the first real coordinates to corresponding first virtual coordinates in the virtual representation of the input device; and
modifying the virtual representation of the input device or a virtual representation of a first object, based on the first virtual coordinates.

4. The method of claim 3, where the modifying includes indicating a selection of a virtual representation of a second object by emphasizing the virtual representation of the second object in the virtual representation of the input device.

5. The method of claim 3, where the modifying includes emphasizing the virtual representation of the first object in the virtual representation of the input device, wherein the emphasizing indicates selection of the virtual representation of the first object.

6. The method of claim 2, comprising:
for each of the one or more objects, generating text related to each object; and
combining the text and the virtual representations of each of the one or more objects in the virtual representation of the input device, for display in the interface.

7. The method of claim 2, comprising:
receiving a user input selecting a first virtual representation that is presented in a two-dimensional representation; and
responsive to receiving the user input, animating the first virtual representation such that the first virtual representation is presented as a three-dimensional representation.

8. The method of claim 1, where the virtual representation of the input device is presented in the interface in response to a first predetermined user input.

9. The method of claim 1, where the virtual representation of the input device is removed from display in the interface in response to a second predetermined user input.

10. The method of claim 1, where the virtual representation of the input device includes a control object, and wherein the virtual representation of the input device is removed from display in the interface in response to a user input selecting the control object.

11. A system comprising:
an input device;
a data processing apparatus; and a data store, in which is stored virtual representation of the input device, wherein dimensions of the input device are proportional to dimensions of the virtual representation of the input device, and real coordinates of the input device are correlated to virtual coordinates in the virtual representation of the input device using anamorphic scaling such that regions closer to edges of the virtual representation of the input device are configured to be less sensitive to physical input, and wherein the virtual representation of the input device is displayed in an interface coupled to the data processing apparatus presenting simultaneously virtual representations of one or more applications that are currently under execution in the data processing apparatus, the virtual representations of the one or more applications including visual representations of corresponding interface windows associated with the one or more applications that are displayed in the interface coupled to the data processing apparatus.

12. The system of claim 11, wherein the virtual representation of the input device includes virtual representations of one or more interactive objects.

13. A non-transitory computer-readable medium having instructions stored thereon, which, when executed by a processor, cause the processor to perform operations comprising:
identifying an input device that is coupled to the processor;
identifying real coordinates of positions on the input device that receive user input;
generating a virtual representation of the input device;
correlating the real coordinates to corresponding virtual coordinates in the virtual representation of the input device using anamorphic scaling such that regions closer to edges of the virtual representation of the input device are configured to be less sensitive to physical input;
presenting the virtual representation of the input device in an interface that is coupled to the processor;
identifying one or more applications that are currently under execution in the processor;
generating virtual representations of each of the one or more applications, wherein the virtual representations of the one or more applications include visual representations of corresponding interface windows associated with the one or more applications that are displayed in a background of the interface coupled to the processing device; and
automatically presenting the virtual representations of each of the one or more applications in the virtual representation of the input device that is displayed in the interface coupled to the processor, wherein the virtual representations of each of the one or more applications are presented simultaneously in the virtual representation of the input device.

14. The non-transitory computer-readable medium of claim 13, comprising instructions to cause the processor to perform operations including:
identifying one or more objects for display in the interface;
generating virtual representations of each of the one or more objects; and
presenting the virtual representations of each of the one or more objects in the virtual representation of the input device.

15. The non-transitory computer-readable medium of claim 14, comprising instructions to cause the processor to perform operations including:
receiving a first input through the input device;
identifying first real coordinates on the input device that identify a position on the input device where the first input was received;
mapping the first real coordinates to corresponding first virtual coordinates in the virtual representation of the input device; and
modifying the virtual representation of the input device or a virtual representation of a first object, based on the first virtual coordinates.

16. The non-transitory computer-readable medium of claim 15, where the modifying includes indicating a selection of a virtual representation of a second object by emphasizing the virtual representation of the second object in the virtual representation of the input device.

17. The non-transitory computer-readable medium of claim 15, where the modifying includes emphasizing the virtual representation of the first object in the virtual representation of the input device, wherein the emphasizing indicates selection of the virtual representation of the first object.

18. The non-transitory computer-readable medium of claim 14, comprising instructions to cause the processor to perform operations including:
for each of the one or more objects, generating text related to each object; and
combining the text and the virtual representations of each of the one or more objects in the virtual representation of the input device, for display in the interface.

19. The non-transitory computer-readable medium of claim 14, comprising instructions to cause the processor to perform operations including:
receiving a user input selecting a first virtual representation that is presented in a two-dimensional representation; and
responsive to receiving the user input, animating the first virtual representation such that the first virtual representation is presented as a three-dimensional representation.

20. The non-transitory computer-readable medium of claim 13, where the virtual representation of the input device is presented in the interface in response to a first predetermined user input.

21. The non-transitory computer-readable medium of claim 13, where the virtual representation of the input device is removed from display in the interface in response to a second predetermined user input.

22. The non-transitory computer-readable medium of claim 13, where the virtual representation of the input device includes a control object, and wherein the instructions cause the processor to perform operations including removing the virtual representation of the input device from display in the interface in response to a user input selecting the control object.

23. A computer-implemented method comprising:
generating a virtual representation of an input device that is coupled to a processing device, the virtual representation of the input device having dimensions that are proportional to dimensions of the input device according to a predetermined ratio;
identifying real coordinates of positions on the input device that receive user input;
identifying virtual coordinates of corresponding positions on the virtual representation of the input device based on the predetermined ratio;
correlating the real coordinates to the virtual coordinates in the virtual representation of the input device using anamorphic scaling such that regions closer to edges of the virtual representation of the input device are configured to be less sensitive to physical input;

presenting the virtual representation of the input device in an interface that is coupled to the processing device;

identifying one or more applications that are currently under execution in the processing device;

generating virtual representations of each of the one or more applications, wherein the virtual representations of the one or more applications include visual representations of corresponding interface windows associated with the one or more applications that are displayed in a background of the interface coupled to the processing device; and presenting simultaneously, independent of receiving a user input, the virtual representations of each of the one or more applications in the virtual representation of the input device that is displayed in the interface coupled to the processing device.

24. A computer-implemented method comprising:

receiving input through an input device that is coupled to a processing device;

identifying real coordinates of positions on the input device that received the input;

mapping the real coordinates to virtual coordinates of corresponding positions on a virtual representation of the input device displayed in an interface that is coupled to the processing device, wherein the mapping includes using anamorphic scaling such that regions closer to edges of the virtual representation of the input device are configured to be less sensitive to physical input;

identifying a virtual object displayed in the virtual representation of the input device that corresponds to the virtual coordinates; and activating an object that corresponds to the virtual object for display in the interface, wherein the virtual object includes a visual representation of a corresponding interface window associated with the object that is simultaneously displayed in the interface that is coupled to the processing device independent of receiving user input.

25. The method of claim 24, wherein the virtual object includes a portion of a document and activating the object for display includes displaying the portion of the document in the interface.

26. The method of claim 24, wherein the object is a file directory and activating the object for display includes displaying contents of the file directory in the interface.

27. The method of claim 24, wherein the object is a software application and activating the object for display includes displaying one or more application windows of the software application in the interface.

28. The method of claim 27, wherein virtual representations of the one or more application windows are displayed in the virtual representation of the input device.

29. The method of claim 1, wherein the virtual representations of the one or more applications include different types of visual representations of different types of content.

30. The non-transitory computer-readable medium of claim 13, wherein the virtual representations of the one or more applications include different types of visual representations of different types of content.

31. The method of claim 1, wherein automatically presenting the virtual representations of each of the one or more applications in the virtual representation of the input device comprises:

displaying, in the interface coupled to the processing device, the virtual representations of each of the one or more applications included in the virtual representation of the input device independent of receiving a user input.

32. The non-transitory computer readable medium of claim 13, wherein the instructions that cause the processor to perform operations comprising automatically presenting the virtual representations of each of the one or more applications in the virtual representation of the input device comprises instructions that cause the processor to perform operations comprising:

displaying, in the interface coupled to the processor, the virtual representations of each of the one or more applications included in the virtual representation of the input device independent of receiving a user input.

* * * * *

UNITED STATES PATENT AND TRADEMARK OFFICE
CERTIFICATE OF CORRECTION

PATENT NO. : 8,427,438 B2
APPLICATION NO. : 12/412218
DATED : April 23, 2013
INVENTOR(S) : John O. Louch Page 1 of 1

It is certified that error appears in the above-identified patent and that said Letters Patent is hereby corrected as shown below:

In the Claims:

Claim 11, column 13, line 1, delete "virtual" and insert -- a virtual --, therefor.

Signed and Sealed this
Sixteenth Day of July, 2013

Teresa Stanek Rea
*Acting Director of the United States Patent and Trademark Office*